US012730040B2

(12) United States Patent
Liu et al.

(10) Patent No.: US 12,730,040 B2
(45) Date of Patent: Sep. 8, 2026

(54) CHELATOR BASED ELUENTS FOR SOLID PHASE EXTRACTION OF PHOSPHORYLATED COMPOUNDS

(71) Applicant: Waters Technologies Corporation, Milford, MA (US)

(72) Inventors: Xiaoxiao Liu, Natick, MA (US); Matthew Lauber, North Smithfield, RI (US); Michael Donegan, Charlton, MA (US)

(73) Assignee: Waters Technologies Corporation, Milford, MA (US)

(*) Notice: Subject to any disclaimer, the term of this patent is extended or adjusted under 35 U.S.C. 154(b) by 305 days.

(21) Appl. No.: 18/643,216

(22) Filed: Apr. 23, 2024

(65) Prior Publication Data

US 2024/0280450 A1 Aug. 22, 2024

Related U.S. Application Data

(63) Continuation of application No. 17/112,408, filed on Dec. 4, 2020, now Pat. No. 11,994,453.

(60) Provisional application No. 62/944,153, filed on Dec. 5, 2019.

(51) Int. Cl.

| | |
|---|---|
| ***G01N 1/40*** | (2006.01) |
| ***B01D 15/42*** | (2006.01) |
| ***B01J 20/28*** | (2006.01) |
| ***B01J 20/281*** | (2006.01) |
| ***B01J 20/34*** | (2006.01) |
| ***G01N 30/06*** | (2006.01) |
| ***G01N 30/16*** | (2006.01) |
| *G01N 30/00* | (2006.01) |

(52) U.S. Cl.

CPC .......... *G01N 1/405* (2013.01); *B01D 15/426* (2013.01); *B01J 20/28052* (2013.01); *B01J 20/281* (2013.01); *B01J 20/3475* (2013.01); *G01N 30/06* (2013.01); *G01N 30/16* (2013.01); *B01J 2220/54* (2013.01); *G01N 2030/009* (2013.01); *G01N 2030/067* (2013.01)

(58) Field of Classification Search

CPC ........ G01N 1/405; G01N 30/06; G01N 30/16; G01N 2030/009; G01N 2030/067; B01D 15/426; B01J 20/28052; B01J 20/281; B01J 20/3475; B01J 2220/54

See application file for complete search history.

(56) References Cited

U.S. PATENT DOCUMENTS

| | | | |
|---|---|---|---|
| 7,445,894 | B2 | 11/2008 | Agnew et al. |
| 2008/0227092 | A1 | 9/2008 | Lohse et al. |

FOREIGN PATENT DOCUMENTS

| | | | |
|---|---|---|---|
| WO | 2012107572 | A1 | 8/2012 |
| WO | 2012170491 | A1 | 12/2012 |

OTHER PUBLICATIONS

Nuckowski et al., Journal of Chromatography B 1090 (2018) 90-100.*

Alagesan et al. “It is all about the solvent: on the importance of the mobile phase for ZIC-HILIC glycopeptide enrichment.” Anal. Bioanal. Chem. 409(2017): 529-538.

International Search Report and Written Opinion issued in International Application No. PCT/IB2020/061541 dated Mar. 23, 2021.

Lauber et al. “Rapid Preparation of Released N-Glycans for HILIC Analysis Using a Labeling Reagent that Facilitates Sensitive Fluorescence and ESI-MS Detection.” Anal. Chem. 87.10(2015): 5401-5409.

* cited by examiner

*Primary Examiner* — John Kim

(74) *Attorney, Agent, or Firm* — WOMBLE BOND DICKINSON (US) LLP; Deborah M. Vernon; Ricardo Joseph

(57) ABSTRACT

The present technology relates to a method for improved recovery of phosphorylated compounds (e.g., phosphorylated glycans). In particular, the present technology utilizes certain chelator additives in a solution to wash and elute the phosphorylated compounds from a solid phase extraction cartridge.

7 Claims, 7 Drawing Sheets

CHELATOR BASED ELUENTS FOR SOLID PHASE EXTRACTION OF PHOSPHORYLATED COMPOUNDS

CROSS-REFERENCE TO RELATED APPLICATIONS

This application is a continuation of U.S. application Ser. No. 17/112,408 filed Dec. 4, 2020, now U.S. Pat. No. 11,994,453, which claims the benefit of U.S. Provisional Application Ser. No. 62/944,153, filed on Dec. 5, 2019, the entire contents of each are incorporated by reference herein.

FIELD OF THE TECHNOLOGY

The present disclosure relates to the use of chelator additives to improve solid phase extraction recovery of compounds, and in particular phosphorylated glycans. More specifically, the present disclosure relates to the use of chelator additives that are soluble in both aqueous and acetonitrile solutions and used in an elution step to obtain a high yield and unbiased recovery of phosphorylated compounds, including, various glycan species, during solid phase extraction (SPE).

BACKGROUND

The extraction of oligosaccharides from a sample matrix is an important step in many different types of analyses. In one example, the oligosaccharides that are attached to proteins are released by chemical or enzymatic procedures and the resulting so-called "glycans" are profiled using liquid chromatography. However, it is generally necessary to derivatize the released glycans prior to analysis so that they can be detected by either UV, fluorescence or mass spectrometry.

With this type of analysis, there is often a need to extract the oligosaccharides by solid phase extraction (SPE) to minimize interference with either the derivatization reactions or the chromatographic separation. A commonly employed derivatization approach using a GlycoWorks RapiFluor-MS kit (commercially available from Waters Corporation, Milford, MA) produces a derivatized N-glycan sample in a matrix of reaction byproducts that can complicate multiple forms of chromatography, including hydrophilic interaction chromatography (HILIC) and reversed phase (RPLC) separations. Accordingly, SPE is employed to enrich the oligosaccharides and improve the quality of the assay.

Historically, there has been a significant challenge to recover and analyze phosphorylated glycan species. This is problematic because some specific types of proteins, like many enzymes responsible for the lysosomal functions, are post-translationally modified with mannose-6-phosphate. In fact, mannose-6-phosphate is critical to the uptake of lysosomal enzymes when they are used as enzyme replacement therapies.

It would be advantageous to develop SPE kits, elution solutions, and methods that can produce a high yield as well as be unbiased in its recovery of various glycan species. In addition, it would be advantageous to develop an SPE procedure to extract oligosaccharides that minimizes interference with derivatization reactions or subsequent chromatographic separations. It would also be advantageous to develop SPE kits, elution solutions, and methods for the extraction of other phosphorylated compounds, including, but not limited to, oligonucleotides, phosphorylated peptides, phosphorylated proteins, glyphosate/glyphosate related species, bisphosphonate drugs, and phospholipids.

SUMMARY

The present technology provides an optimized SPE elution solution with select chelator additives to minimize the loss of phosphorylated glycans during solid phase extraction. Without wishing to be bound by theory, it is believed that the chelator additive serves to disrupt the adsorption of the phosphoglycans to metal contaminants in an SPE device. Phospho groups exhibit a natural propensity for chelation to metals. While not limited to this theory, there might also be an effect that the chelator plays in disrupting Lewis acid/base interactions with the heteroatoms of the sorbent. GlycoWorks (available from Waters Corporation) HILIC SPE is based on an aminoproyl bonded silica sorbent. The nitrogen atoms of the sorbent might create a site for Lewis acid-base interaction that can only be displaced by the introduction of a strong chelator. No matter the mechanism at play, the present technology which uses a chelator-based eluent is an effective means to improving the SPE recovery of phosphorylated glycans.

In some embodiments the chelator additive is selected due to its solubility properties. For example, in embodiments wherein it is desirous to perform HILIC after the SPE separation, it is advantageous to use a chelator additive that is soluble in acetonitrile. Certain chelators, such as editronate, precipitate out of solution in high concentrations of acetonitrile. These precipitates can create blockages or interfere with the subsequent HILIC separation/equipment. In other embodiments where RPLC is to be performed subsequent to SPE, a chelator that is soluble in an aqueous solution is desirable. Divalent or higher valency carboxylic acids at concentrations of between about 1 mM to about 200 mM are soluble in both aqueous solutions and high percentages of acetonitrile. An example of a trivalent carboxylic acid that can be used in the present technology is citric acid (the solid form being citrate, such as sodium citrate). Additional exemplary trivalent acids of utility in the present technology include isocitric acid, 2,3 hydroxycitric acid, tricarballylic acid, ethanetricarboxylic acid (HETA) and aconitic acid. Other divalent or higher valency carboxylic acids can also be utilized. It is reasonable to suggest that succinic acid, maleic acid, fumaric acid, oxaloacetic acid, and ketoglutaric acid would be of some utility in the present technology. Tetravalent carboxylic acids, like EDTA (ethylenediaminetetraacetic acid), butanetetracarboxylic acid, NTA, DTPA, DOTA, IDHA, EDDHA, might also be of some utility. In an alternative embodiment, there is potential for dimethylgloxime and diethyltriamine to be used in the present technology. In general, the concentration of the divalent or higher valency carboxylic acid within the elution solution should be about or less than 1 M, and preferably less than about 200 mM (e.g., between about 0.5 to 200 mM). In some embodiments, the concentration is about or less than 100 mM, and is in the range of about 1 mM to 100 mM. In certain embodiments, the concentration is in the range of between 10 mM and 100 mM. In other embodiments, the concentration is in the range of between 40 mM and 60 mM, such as, for example, about 50 mM.

In one aspect, the technology relates to a method of performing solid phase extraction. The method includes injecting a sample comprising glycans into a solid phase extraction cartridge. The SPE cartridge including a stationary phase, wherein the glycans are retained by the stationary phase. The method also includes washing the SPE cartridge with a divalent or higher valency carboxylic acid at a concentration of between about 1 mM to about 100 mM to elute the glycans from the SPE cartridge.

In another aspect, the technology relates to a method of performing solid phase extraction. The method includes injecting a sample comprising glycans into a solid phase extraction cartridge. The SPE cartridge including a stationary phase, wherein the glycans are retained by the stationary phase. The method also includes washing the SPE cartridge with a citric acid at a concentration of between about 1 mM to about 100 mM to elute the glycans from the SPE cartridge. In one embodiment, the concentration is between about 40 mM and 60 mM (e.g., 45 mM, 50 mM, 55 mM) to elute the glycans from the SPE cartridge.

In accordance with another aspect, the technology relates to a method of performing solid phase extraction. The method includes injecting a sample comprising glycans into a solid phase extraction cartridge comprising a stationary phase, wherein the glycans are retained by the stationary phase. The method also includes washing the solid phase extraction cartridge with an eluent solution to elute the glycans from the solid phase extraction cartridge, wherein the eluent solution comprises (i) a salt to adjust ionic strength of the eluent solution and (ii) a divalent or higher valency carboxylic acid at a concentration of between about 1 mM to about 100 mM.

Some embodiments of this aspect of the technology include one or more of the following features. In some embodiments, the salt is selected from the group consisting of ammonium formate, ammonium acetate, sodium formate, sodium acetate, ammonium chloride, sodium chloride, potassium chloride, triethylammonium acetate, and tetramethyl ammonium acetate. In certain embodiments the elution solution is prepared with a co-solvent selected from the group consisting of acetonitrile, methanol, ethanol, propanol, butanol, tetrahydrofuran, an isopropanol.

In accordance with another aspect, the technology relates to a method of performing solid phase extraction. The method includes injecting a sample comprising glycans into a solid phase extraction cartridge comprising a stationary phase, wherein the glycans are retained by the stationary phase. The method also includes washing the solid phase extraction cartridge with an eluent solution to elute the glycans from the solid phase extraction cartridge, wherein the eluent solution comprises (i) a salt to adjust ionic strength of the eluent solution and (ii) citric acid at a concentration of between about 1 mM to about 100 mM. In certain embodiments, the concentration of citric acids is between about 40 mM and about 60 mM.

Some embodiments of this aspect of the technology include one or more of the following features. In some embodiments, the salt is selected from the group consisting of ammonium formate, ammonium acetate, sodium formate, sodium acetate, ammonium chloride, sodium chloride, potassium chloride, triethylammonium acetate, and tetramethyl ammonium acetate. In certain embodiments the elution solution is prepared with a co-solvent selected from the group consisting of acetonitrile, methanol, ethanol, propanol, butanol, tetrahydrofuran, an isopropanol.

In another aspect, the technology relates to a method of performing solid phase extraction. In particular, the solid phase extraction is performed to elute oligonucleotides. Similar to phosphoglycans and glycans of the previous aspects of the technology, oligonucleotides are polyanionic in nature and tend to nonspecifically bind to plasma proteins, sample plates and vials. This propensity to bind to contact surfaces in addition to sample matrices has resulted in poor recoveries when performing common analytical extraction techniques such as SPE. The use of a polycarboxylate chelating agent added during the elution step in weak anion exchange SPE is yet another embodiment of this invention and it yields improved recovery of oligonucleotides by reducing the nonspecific binding to surfaces and sample matrices. The method according to this aspect of the technology includes injecting a sample comprising one or more oligonucleotides into a solid phase extraction cartridge comprising a stationary phase, wherein the one or more oligonucleotides are retained by the stationary phase. The method further includes washing the solid phase extraction cartridge with a divalent or higher valency carboxylic acid (e.g., citric acid, polycarboxylic acid) at a concentration of between about 10 mM to about 1 M to elute the one or more oligonucleotides from the solid phase extraction cartridge.

In a further aspect, the technology relates to a method of performing solid phase extraction which includes injecting a sample comprising one or more oligonucleotides into a solid phase extraction cartridge comprising a stationary phase, wherein the one or more oligonucleotides are retained by the stationary phase. The method also includes washing the solid phase extraction cartridge with an eluent solution to elute the one or more oligonucleotides from the solid phase extraction cartridge, wherein the eluent solution comprises (i) a salt to adjust ionic strength of the eluent solution and (ii) polycarboxylic acid (or other divalent or higher valency carboxylic acid) at a concentration of between about 10 mM to about 1 M. In certain embodiments, the concentration of polycarboxylic acid is between about 40 mM and about 60 mM.

While the last two aspects of the present technology relate to the extraction of oligonucleotides and the previous aspects related to the extraction of phosphorylated glycans, other biological samples can benefit from the improved SPE protocols and elution solutions of the present technology. For example, the present technology is also applicable to SPE for the extraction of any phosphorylated compound, including the following applications: glyphosate (and related organophosphorus compounds), phospholipids, bisphosphonate drugs, peptides, and proteins.

In some embodiments, the concentration of divalent or higher valency carboxylic acid is between about 0.5 mM to about 1 M. The concentration of divalent or higher valency carboxylic acid can be between about 1 mM to about 100 mM. The concentration of divalent or higher valency carboxylic acid can be between about 40 mM to about 60 mM (e.g., 45 mM, 50 mM, 55 mM).

In some embodiments, walls of the solid phase extraction cartridge are formed of plastic. In some embodiments, the solid phase extraction cartridge is a packed syringe. The solid phase extraction cartridge can be a well plate. In some other embodiments, the solution containing the divalent or higher valency carboxylic acid is used to mitigate the loss of sample to a container vessel.

BRIEF DESCRIPTION OF THE DRAWINGS

The technology will be more fully understood from the following detailed description taken in conjunction with the accompanying drawings, in which:

FIG. 2A shows a chromatogram with 50 mM of sodium etidronate (pH 7) spiked in sample matrix before SPE clean up; FIG. 2B shows a chromatogram with 50 mM of sodium etidronate (pH 7) spiked in SPE elution solution;

FIG. 2C shows a chromatogram with 50 mM of sodium etidronate (pH 7) spiked in SPE eluate (i.e., spiked after elution); and FIG. 2D shows a chromatogram of a control (with no additive applied).

DETAILED DESCRIPTION

Figures 1A, 1B:
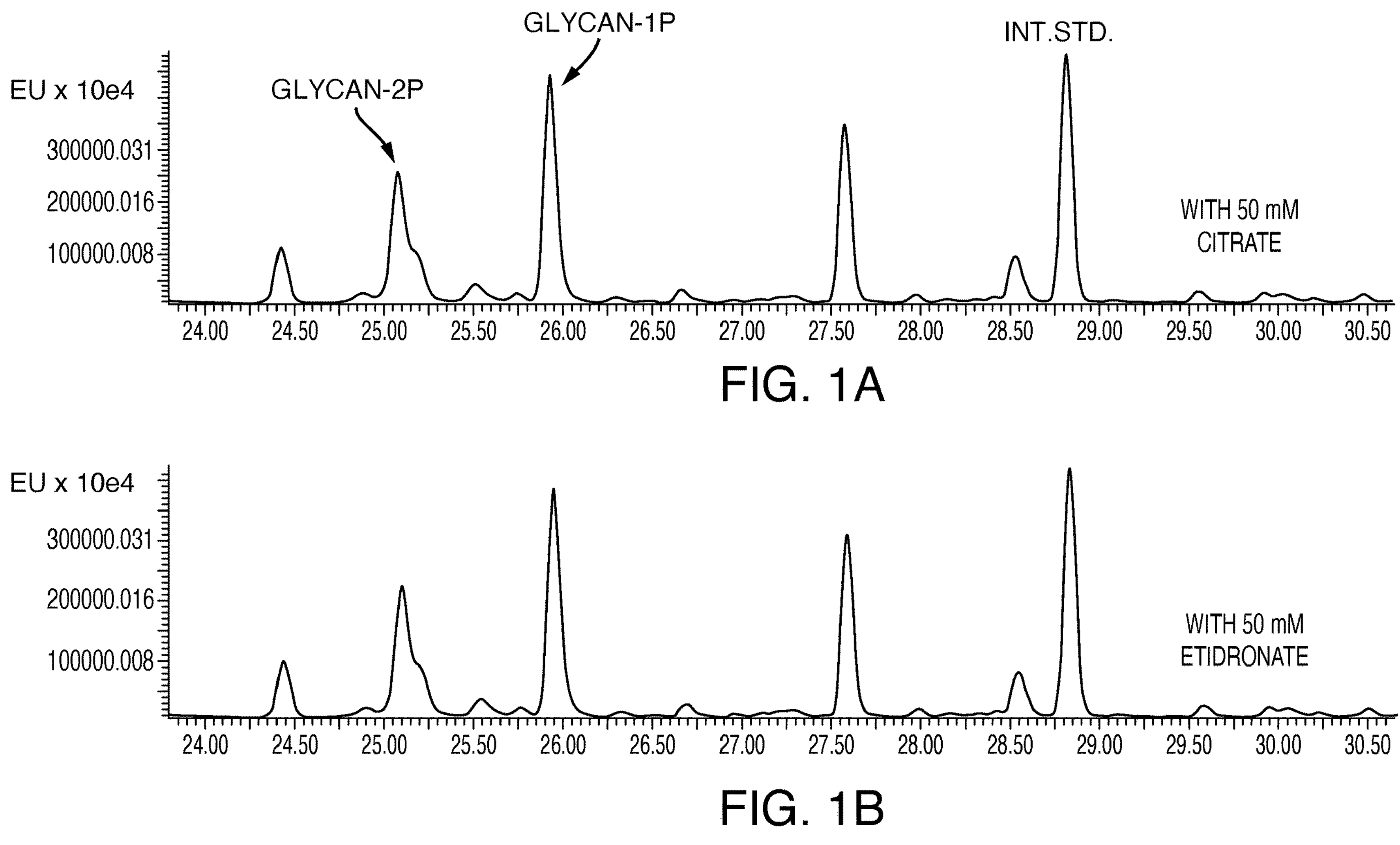
FIG. 1A is a fluorescence chromatogram of selected phosphate glycan markers (zoom-in view) eluted from a SPE cartridge using an elution solution including 50 mM sodium citrate, pH 7. Glycan-2P and Glycan-1P were glycan markers containing two and one phosphorylated residues, respectively.
FIG. 1B is another fluorescence chromatogram of the same selected phosphate glycan markers as shown in FIG. 1A, eluted from a SPE cartridge using an elution solution including 50 mM sodium etidronate, pH 7.
Figures 1C, 1D:
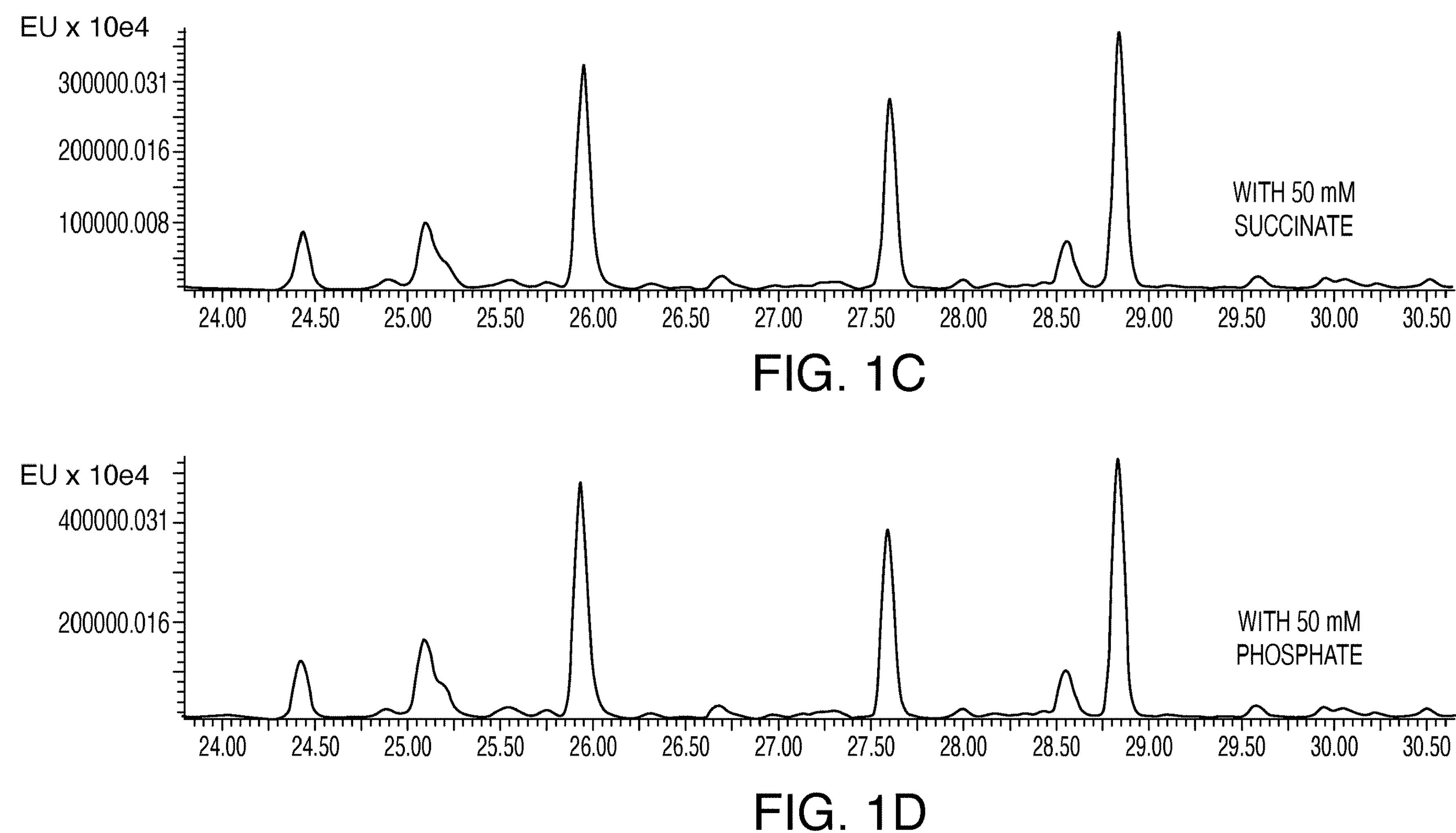
FIG. 1C is another fluorescence chromatogram of the same selected phosphate glycan markers as shown in FIG. 1A, eluted from a SPE cartridge using an elution solution including 50 mM sodium succinate, pH 7.
FIG. 1D is another fluorescence chromatogram of the same selected phosphate glycan markers as shown in FIG. 1A, eluted from a SPE cartridge using an elution solution including 50 mM sodium phosphate, pH 7.
Figure 1E:
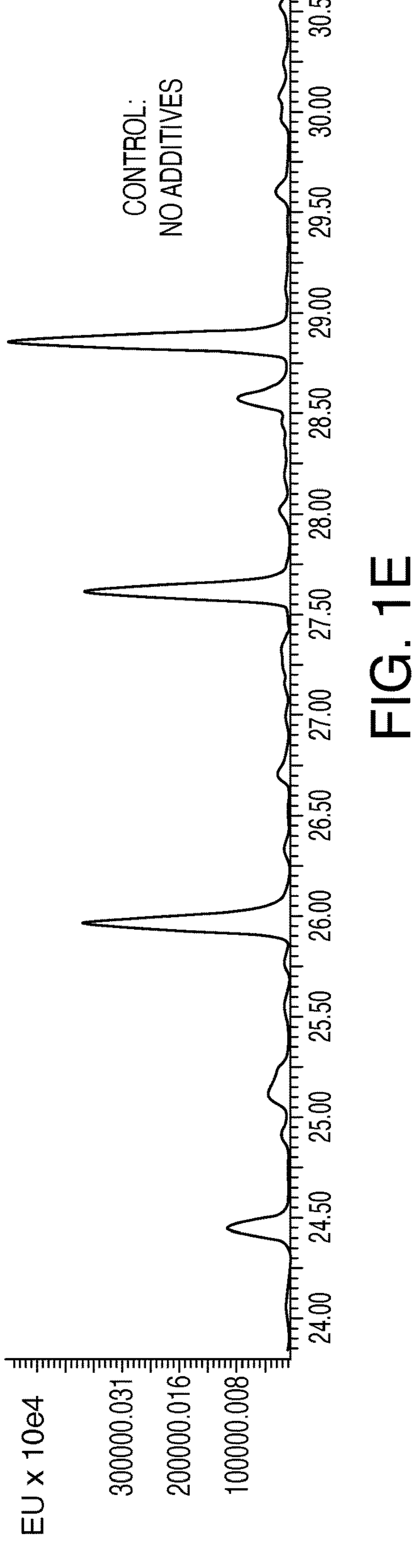
FIG. 1E is another fluorescence chromatogram of the same selected phosphate glycan markers as shown in FIG. 1A, eluted from a SPE cartridge using a control elution solution (i.e., no chelator additive).
Figure 1F:
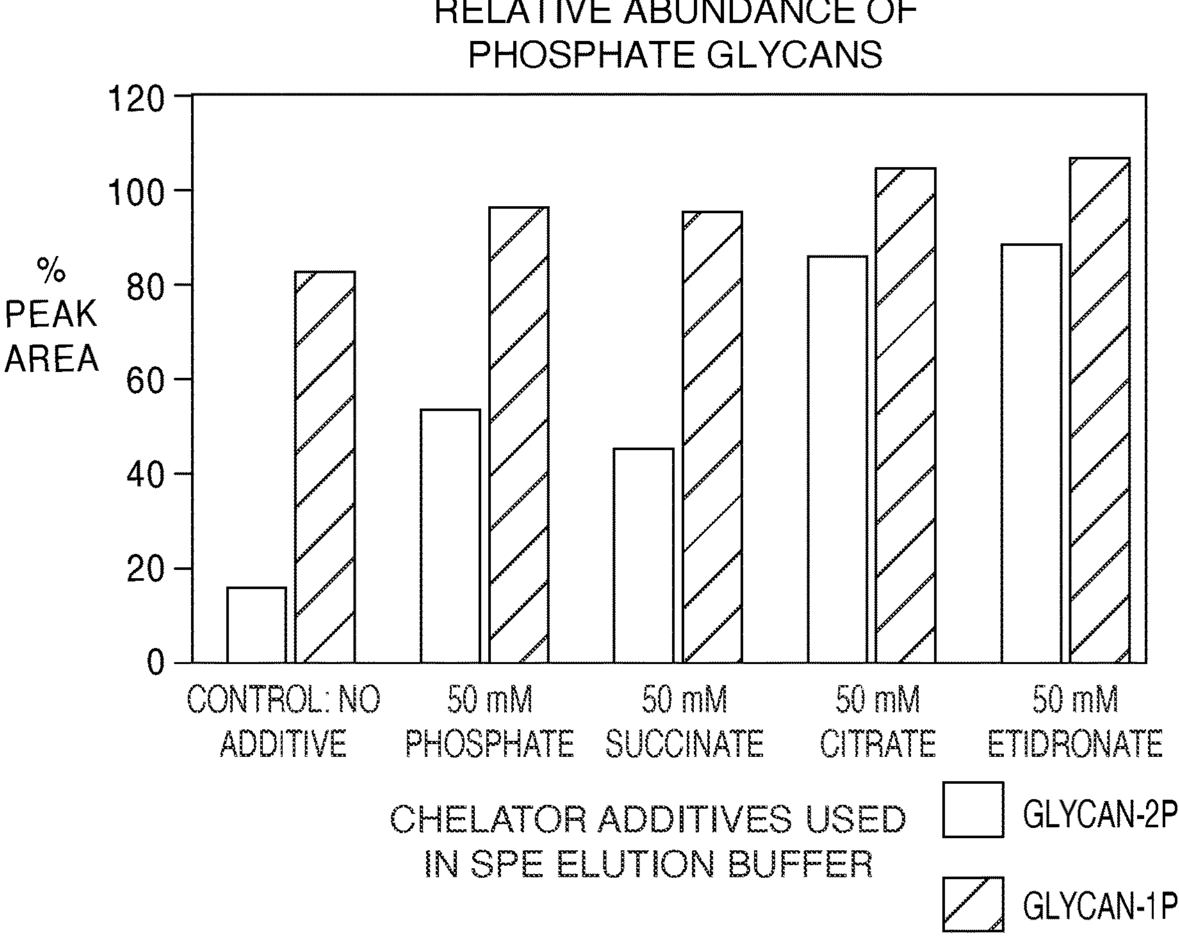
FIG. 1F is a graph showing relative abundance of selected phosphoglycan markers (Glycan-1P, Glycan-2P) for various chelator additives used in an elution solution. The relative abundance of a selected marker as a percentage is equal to (peak area of marker)/(peak area of internal standard)×100 as calculated from FIGS. 1A-1E.

The present technology solves the problems of the prior art by addressing the loss of phosphorylated glycans during solid phase extraction. By adding chelators, and in particular chelators that are soluble in both aqueous and acetonitrile, to the elution solution, an effective means to improving glycan recovery has been surprisingly found. Using this technology, the inventors have discovered a high recovery SPE protocol that takes advantage of a chelator additive to achieve unprecedented recoveries for not only singly but also doubly phosphorylated glycan species. One theory for the improved recovery is that the chelator additive serves to disrupt the adsorption of the phosphoglycans to metal contaminants in an SPE device. Phospho groups exhibit a natural propensity for chelation to metals. Another theory, which may be additive or alternative to the first, is that there might also be an effect that the chelator plays in disrupting Lewis acid/base interactions with the heteroatoms of the sorbent. GlycoWorks (available from Waters Corporation) HILIC SPE is based on an aminoproyl bonded silica sorbent. The nitrogen atoms of the sorbent might create a site for Lewis acid-base interaction that can only be displaced by the introduction of a strong chelator. No matter the mechanism at play, the present technology which uses a chelator-based eluent is an effective means to improving the SPE recovery of phosphorylated glycans.

In one embodiment, the SPE protocol of the present technology, is performed with a HILIC mode of separation and GlycoWorks HILIC SPE microlution plate (available from Waters Corporation, Milford, MA). In other embodiments, an alternative HILIC sorbent might be used, such as, for example, an aminopropyl bonded silica or amide containing hydrophilic-lipophilic balanced polymer. Examples of other sorbents of utility in the instant invention include, but are not limited to, Sep-Pak amino propyl (available from Waters Corporation), Oasis HLB (available from Waters Corporation), Glycoclean H (available from Agilent Technologies, Santa Clara, CA), Strata X (available from Phenomenex Inc., Torrance, CA) and BioZen N-Glycan HILIC (available from Phenomenex Inc., Torrance, CA). In some embodiments, these SPE separations can involve mixed mode retention and more specifically, an added ion exchange retention mechanism. In yet other embodiments, the separation mechanism might be reversed phase based.

The present technology relates to an improved SPE protocol that minimizes the loss of phosphorylated glycans during extraction. In general, the methods of the present technology can be used in numerous applications in which glycan analysis is studied/profiled. Typically, released glycans need to be derivatized or enriched prior to chromatographic separation and detection. Examples of other possible applications include, but are not limited to SPE of oligonucleotides, glyphospates, phospholipids, bisphosphonate drugs, peptides, and proteins.

In general, the present technology is directed to a SPE protocol that utilizes chelator additives to minimize losses of the glycans during extraction. The chelator additive can be selected to be soluble in both aqueous as well high acetonitrile based solutions. For example, the chelator additive can be a divalent or higher valence carboxylic acid (e.g., citric acid). The chelator additive is present in the eluent. That is, the chelator additive is part of the elution solution used to wash the stationary phase in an SPE cartridge to form an eluant. Typically, the chelator additive is present at a concentration of less than about 200 mM. For example, the elution solution can include a concentration in the range of 1 mM to 100 mM of citric acid.

In addition to the chelator additive, salts can be added to the elution solution to adjust the ionic strength of the solution. Examples of salts used in the present technology include, but are not limited to: ammonium formate, ammonium acetate, sodium formate, sodium acetate, ammonium chloride, sodium chloride, potassium chloride, triethylammonium acetate, and tetramethyl ammonium acetate. In certain embodiments the elution solution is prepared with a co-solvent. The co-solvent can be useful for subsequent separation steps (e.g., HILIC or RPLC). Examples of co-solvents include, but are not limited to: acetonitrile, methanol, ethanol, propanol, butanol, tetrahydrofuran, an isopropanol.

In some embodiments, an eluent solution is used for HILIC SPE of glycans that is comprised of a mostly aqueous solution (less than 30% co-solvent) and a chelator additive present at a concentration ranging from 1 to 100 mM. In this eluent, other salts can be added to adjust ionic strength, including but not limited to ammonium formate, ammonium acetate, sodium formate, sodium acetate, ammonium chloride, sodium chloride, potassium chloride, triethylammonium acetate, and tetramethyl ammonium acetate. Likewise, the co-solvent can be selected from organic solvents that are miscible with water, including but not limited to acetonitrile, methanol, ethanol, propanol, isopropanol, butanol, or pentanol. In this eluent, the chelator can be selected from ammoniated, sodiated, potassiated or protonated forms of etidronate, citrate, succinate, EDTA, medronate, polyphosphonates.

In certain embodiments, citrate is preferred for its solubility in multiple solvent systems, which can be advantageous for injecting SPE eluate onto different forms of chromatography, such as reversed phase chromatography, hydrophilic interaction chromatography, anion exchange chromatography, or mixed mode chromatography. In some embodiments, this eluent is prepared with a neutral pH (pH 7), in others it might be prepared to have a pH as low as pH 3 or as high as pH 10. In one exemplary embodiment, the SPE eluent is comprised of 200 mM ammonium acetate, 50 mM ammonium citrate at pH 7 in a solution of 95/5 water:acetonitrile.

The inventors have also determined that certain chelator additives, such as, for example, the etidronate additive, have poor solubility in high acetonitrile solutions, which limits its utility, especially when needing to perform HILIC after the SPE extraction. With the precipitation of the etidronate, it is possible for there to also be sample losses due to the co-precipitation of analyte. In addition, the precipitate can cause LC failures, as can occur with the blockage of the injection needle. Accordingly, it is advantageous to make use of an additive that is soluble in both mostly aqueous as well as high acetonitrile solutions. With such an additive, it becomes possible to convert the SPE eluate into a diluent suitable for either RPLC or HILIC, respectively. By visual inspection, we have observed that 50 mM etidronate will precipitate in in 89.5:7.5:3 (v/v) ACN/water/DMF solution, which is a recommend diluent composition for performing HILIC on a RapiFluor-MS labeled N-glycan sample. In contrast, we have observed no such problems with 50 mM citrate. Based on this observation, citrate is preferred over etidronate and other chelators, including EDTA. In some embodiments, a chelator additive is selected for its solubility characteristics and specifically for its ability to be soluble in a HILIC sample diluent.

Citrate (e.g., citric acid) and other divalent or higher valency carboxylic acids appear to be soluble in both aqueous and high acetonitrile solutions, making these chelator additives the optimal choice for the SPE protocols of the present technology.

Example 1: Optimized Protocol Using a GlycoWorks RapiFluor-MS N-Glycan and a Chelator Based SPE Eluent for High Recovery Preparation of Phosphorylated Glycans The protocol for recovering the glycans included: preparing a reagent (i.e., optimized elution solution/buffer), preparing the biological sample including the glycans, and HILIC SPE clean-up of the biological sample to elute the glycans. The reagent used was prepared using the following procedure:

a) Reagent used:

1. 5% (w/v) RapiGest solution:
   Dissolve 10 mg RapiGest in 200 μL of 5× GlycoWorks Rapid Buffer. Vortex to mix.
2. Rapid labeling reagent (prepare right before use):
   Dissolve 9 mg of the RapiFluor-MS reagent powder in 131 μL of the provided GlycoWorks reagent solvent anhydrous DMF. Aspirate and dispense the solution 5-10 times to ensure all reagent is dissolved.
3. Optimized SPE elution buffer: with 50 mM of selected chelator additives
   Transfer 10 mL GlycoWorks SPE elution buffer into 15 mL conical tube. Add 0.5 mL of 1M sodium citrate solution (pH 7) into the tube. Vortex to mix. The final concentration of sodium citrate is 50 mM.

The biological sample was prepared by using the following procedure:

b) Deglycosylation and rapid labeling of glycosylamine

1. Dilute glycoprotein concentration to 2 mg/mL with MilliQ water. Vortex to mix.
2. Add 15.3 μL of MilliQ water into 1 mL tube.
3. Dispense 7.5 μL of 2 mg/mL glycoprotein into the same 1 mL tube.
4. Add 6 μL of 5% RapiGest solution, aspirate and dispense to mix.
5. Heat denature this mixture for 3 min with a heating block settled to at least 90° C.
6. Remove the 1 mL tube from heating block, allow it to cool allow it to cool at room temperature for at least 3 min.
7. Add 1.2 μL of PNGase F into the mixture, aspirate and dispense to mix.
8. Incubate at 50 C for 5 min with another heating block.
9. Remove the 1 mL tube from heating block, allow it to cool at room temperature for at least 3 min. Prepare rapid labeling reagent during incubation.
10. Add 12 μL of rapid labeling solution, aspirate and dispense to mix.
11. Incubate at room temperature for 5 min
12. Dilute with 358 μL Acetonitrile The SPE Clean-Up of the sample with the prepared reagent (e.g., elution solution) was performed using the following procedure:

c) HILIC SPE Clean-Up with optimized SPE elution buffer

1. Combine HILIC μElution plate with waste tray. Drive flow with either a vacuum (2.5-4 in Hg) or positive pressure (~3 psi) manifold.
2. Condition HILIC μElution plate with 200 μL of MilliQ water
3. Equilibrate plate with 200 μL of 15:85 (v/v) water/acetonitrile
4. Load the acetonitrile diluted samples on plate
5. Wash the well with two 600 μL volumes of 1:9:90 (v/v/v) formic acid/water/acetonitrile
6. Replace the waste tray with a 96-well collection plate
7. Elute glycans with three 30 μL volumes of optimized SPE elution buffer The released glycans (from a lysosomal enzyme obtained from Genzyme Corp, Cambridge, MA) were prepared and labeled using the optimized protocol described above. After SPE clean-up, all elution fractions were transferred into QuanRecovery sample vials (Waters Corporation, Milford, MA) and analyzed by LC-FLR-MS with 1 μL injection. A glycan with two phosphorylated residues was observed with a retention time of approximately 25 min and is labeled as the so-called "Glycan-2P' species [1015.85 m/z, 2+; $(Hex)_5(HexNAc)_2(Man\text{-}6\text{-}P)_2$]. A singly phosphorylated glycan was also observed at a retention time of 25.8 min and is labeled as the so-called "Glycan-1P' species [1222.96 m/z, 2+; $(Hex)_6(HexNAc)_3(NeuNAc)_1(Man\text{-}6\text{-}P)_1$]. These two species were selected as markers for monitoring yields and recovery. A non-phosphorylated glycan with an observed retention time of ~28.8 min was also monitored and used as an internal standard [Int. Std.; 894.36 m/z, 3+ $(Hex)_5(Fuc)_1(HexNAc)_4(NeuNAc)_2$] to calculate the relative abundance of the phosphorylated glycan markers. The relative abundance of the phosphorylated glycan markers was calculated according to their peak areas observed by fluorescence chromatographic detection.

The fluorescence chromatograms of SPE Extracted RapiFluor-MS labeled N-Glycans shown in FIGS. 1A-1E were generating using the following parameters and protocol:

| | |
|---|---|
| System: | ACQUITY UPLC ® H-Class Bio System [Consisting of a QSM with 100 μL Mixer, TUV Detector (Flow cell: 500 nL Analytical), FTN-SM, and CH-A heater] [Post-column tubing to FLR: 0.0025" ID PEEK, 8.5" Length (p/n 700009971)] coupled to a Xevo G2-XS QT of Mass Spectrometer |
| Data Acquisition and Analysis: | MassLynx 4.1 |
| Column: | Mixed Mode RPLC/Anion Exchange 1.7 μm, 2.1 × 150 mm |
| Column Temperature: | 60° C. |
| Seal Wash: | 10% HPLC grade Acetonitrile/90% HPLC grade water v/v (Seal Wash interval set to 0.5 min) |
| Sample Manager Wash: | HPLC grade water |
| Mobile Phase A: | 18.2 MΩ HPLC grade water |
| Mobile Phase B: | 100 mM Formic Acid, 100 mM Ammonium Formate in 40:60 (v/v) water/acetonitrile |
| Flow Rate: | 0.4 mL/min |

| | Time (min) | % A | % B | Curve |
|---|---|---|---|---|
| Gradient: | 0.00 | 100.0 | 0.0 | 6 |
| | 36.00 | 78.0 | 22.0 | 6 |
| | 36.30 | 0.0 | 100.0 | 6 |
| | 37.30 | 0.0 | 100.0 | 6 |
| | 38.00 | 100.0 | 0.0 | 6 |
| | 45.00 | 100.0 | 0.0 | 6 |

| | |
|---|---|
| Sample Temp. | 8° C. |
| Samples: | 90 μL of RFMS-labeled released glycan (freshly prepared from 15 μg glycoprotein) |
| Sample dilution: | No dilution applied |
| Sample Injection Volume: | 1 μL |
| FLR Wavelength: | Excitation: 265 nm/Emission: 435 nm |
| FLR Scan Rate: | 10 points/second |
| Time Constant: | 0.2 second |
| MS Capillary Voltage: | 2.2 kV |
| Cone Voltage: | 75 V |
| Source Offset: | 80 V |
| Source Temperature: | 120° C. |
| Desolvation Temperature: | 500° C. |
| Desolvation Gas Flow Rate: | 600 L/Hr |
| Calibration | Sodium Iodide, 100-3000 m/z |
| Acquisition: | 700-3000 m/z |
| Scan time: | 0.1 second |

Example 2: The Relative Abundance of Phosphorylated Glycans Using Different Chelator Additives in SPE Elution Solution In this example, the recovery of phosphorylated glycans from solid phase extraction based upon the presence or absence of various chelator additives was analyzed. To investigate the impact of different chelator additives on phosphoglycan recovery, 1 mL of 0.5 M sodium phosphate, sodium succinate, sodium citrate and sodium etidronate were spiked into 10 mL of GlycoWork SPE elution buffer, respectively, to obtain a final 50 mM concentration. The pH of the concentrated chelator solutions was adjusted to a neutral pH with sodium hydroxide to avoid acid-facilitated hydrolysis of sialic acid residues. Samples prepared without chelator additives were used as controls. As shown in FIGS. 1A-IF, the presence of 50 mM chelator additives, especially citrate and etidronate, in the SPE elution buffer yielded much higher relative abundances and thus recoveries of the doubly phosphorylated glycan (Glycan-2P). In fact, the Glycan-2P species increased from 16% to 89%, and the relative abundance of Glycan-1P increased as well, going from 82% to 104%. In addition, it was observed that the recovery of both phosphorylated glycans did not increase with the supplemental addition of 50 mM ammonium acetate in to a standard SPE elution buffer, containing 200 mM ammonium acetate in 5% acetonitrile (neutral pH). This indicates that the chelating characteristic of the additives, not the increased ionic strength, facilitates the improved recovery of phosphoglycans.

Figures 2A, 2B:
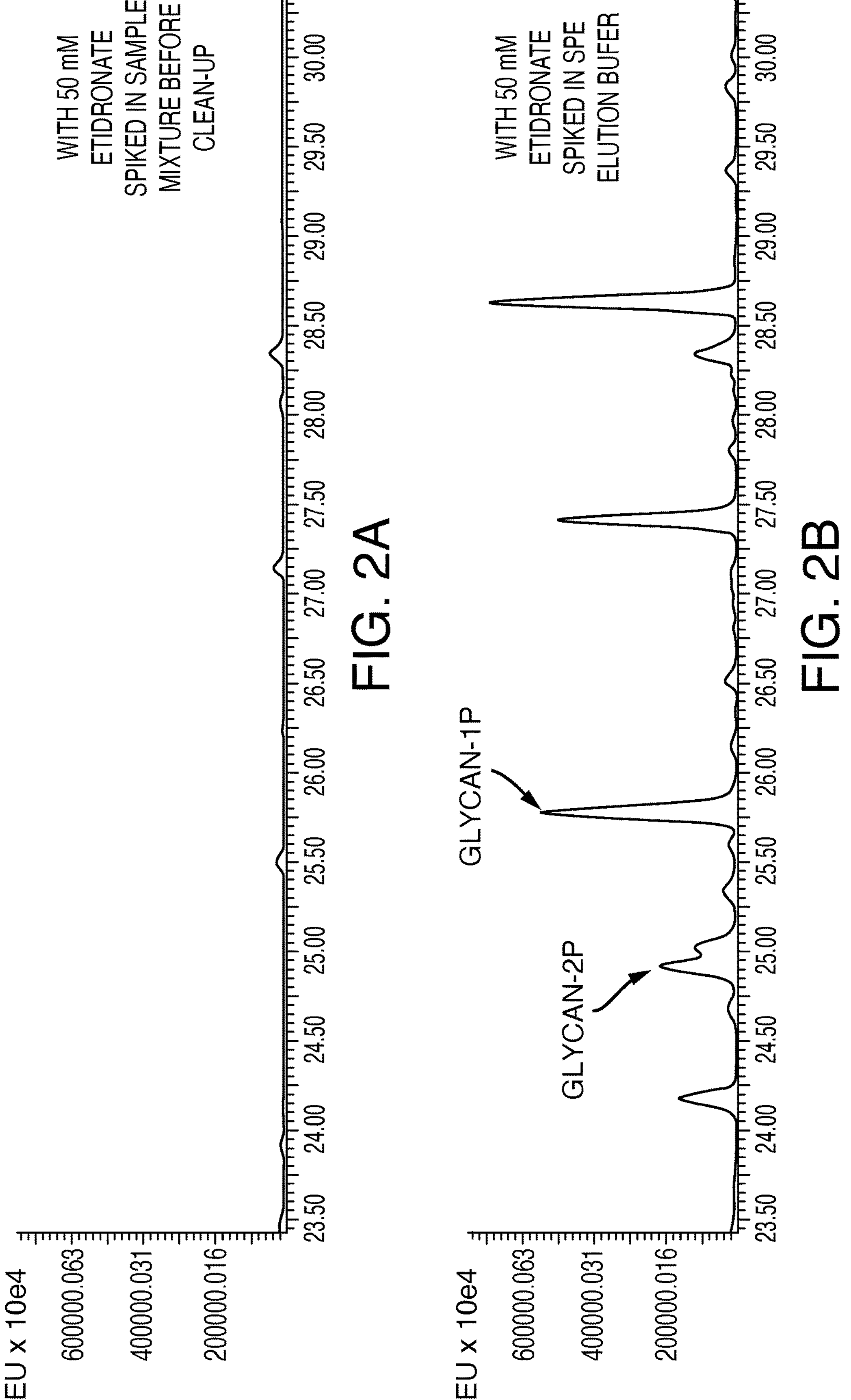
FIGS. 2A-2D are fluorescence chromatograms of selected phosphoglycan markers with etidronate spoked at different sample preparation steps.
Figures 2C, 2D:
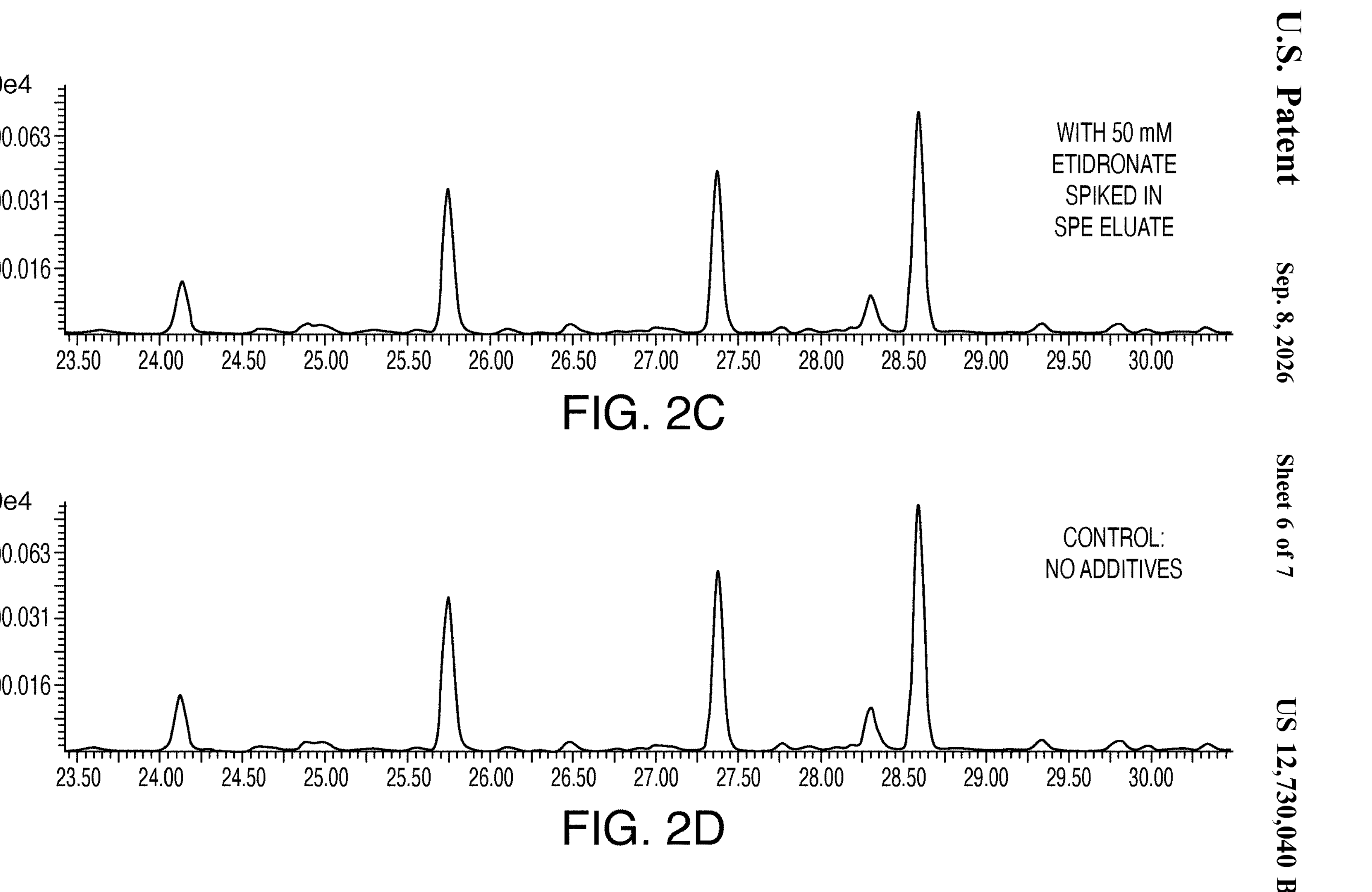

Example 3: The Timing of Applying the Chelator Additive During Sample Preparation Furthermore, the point of implementing the chelator during the SPE process was also investigated. To determine the optimal procedure and the timing of application of the chelator, the chelator additives were incorporated at different stages of the sample preparation and the corresponding effects on phosphoglycan recovery were summarized, as portrayed in FIGS. 2A-2D. In this study, 0.5 M sodium etidronate was spiked into a sample mixture to achieve a final concentration of 50 mM either: a) before SPE clean-up (step b.12) and resulting chromatogram shown in FIG. 2A; b) in SPE elution buffer (as described above) and resulting chromatogram shown in FIG. 2B; or c) in SPE clean-up eluate after elution and resulting chromatogram shown in FIG. 2C. FIG. 2D is a chromatogram of a sample prepared with no chelator additive and was applied as a control. The results from these experiments showed that etidronate spiked in the SPE eluate did not improve the recovery of the phosphoglycan, and that spiking etidronate into the sample mixture before SPE clean-up ha a detrimental effect to the overall intensity of released glycans due to the poor solubility of sodium etidronate in the acetonitrile SPE loading condition. Therefore, adding chelator additives into the SPE elution buffer (eluent) was determined to be the most effective approach to improve phosphoglycan recovery without negative impacting overall mass balance/recoveries.

Example 4: Impact of Chelator Concentration on Phosphoglycan Recovery

Figure 3:
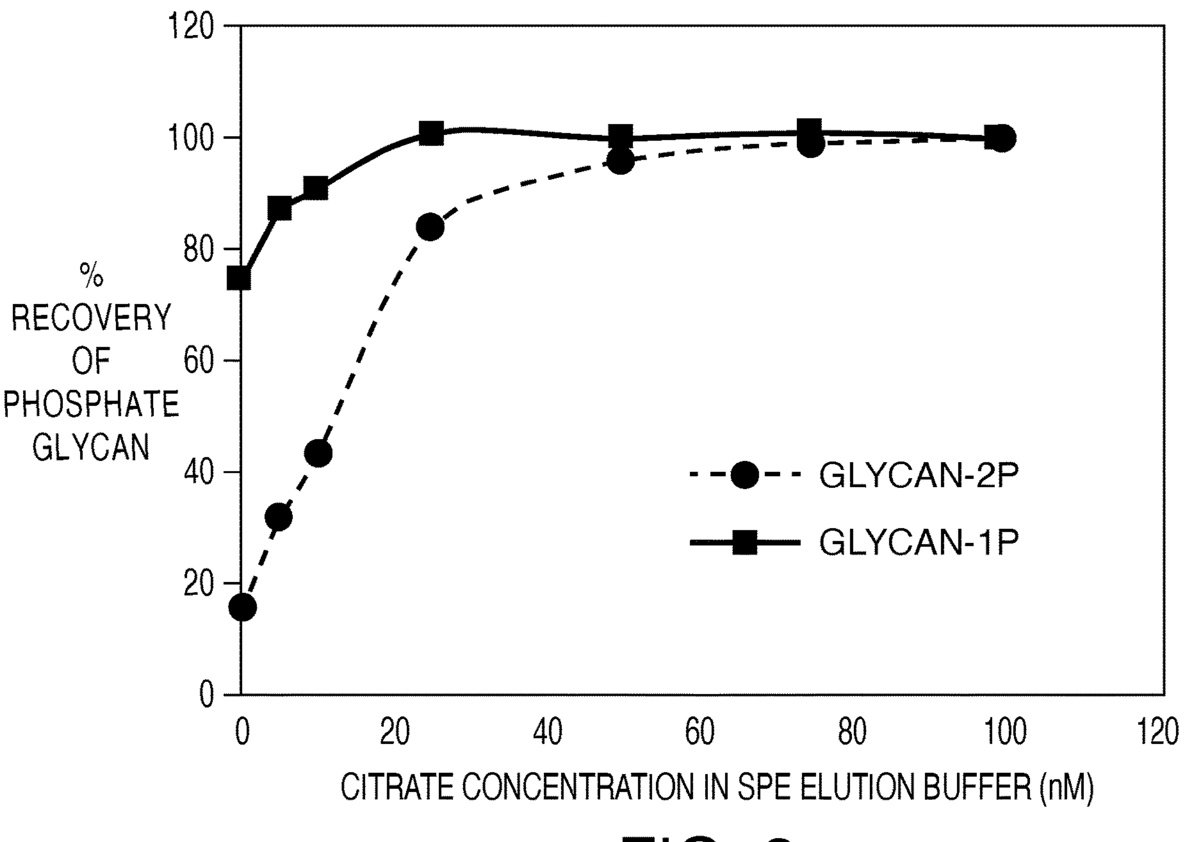
FIG. 3 is a graph of the percentage recovery of Glycan-2P and glycan-IP plotted against sodium citrate concentration in the SPE elution solution.

The concentration of chelator additives in the SPE elution buffer has also been found to be a key factor in maximizing recoveries. To determine the optimal concentration of chelator additives, 0.5 M sodium citrate solution (pH 7) was spiked into SPE elution buffer with a final concentration of either 0 mM (control), 5 mM, 10 mM, 25 mM, 50 mM, 75 mM, or 100 mM. Released glycans were prepared and analyzed as described in Example 1. Percent recovery of the phosphoglycans was calculated using fluorescence peak data and plotted as a function of citrate concentration (see details in FIG. 3). The percent recovery of the phosphoglycan markers prepared with 100 mM citrate was assigned to 100% since those data corresponded to a plateau and ostensibly the maximum recovery of such glycans. As shown in FIG. 3, the percent recovery of Glycan-2P and Glycan-1P improved from 14% to 100%, 74% to 100%, separately, by increasing the concentration of citrate from 0 mM to 50 mM. No further improvement has been observed beyond this concentration. This result suggests that an SPE elution buffer spiked with 50 mM citrate additive is optimized to provide maximum recovery of phosphorylated glycans.

In summary, an optimized SPE elution buffer with select chelator additives is presented as an invention to minimize the loss of phosphorylated glycans during solid phase extraction. It is reasonable to suggest that this chelator serves to disrupt the adsorption of the phosphoglycans to metal contaminants in the SPE device. Phospho groups exhibit a natural propensity for chelation to metals. While not limited to theory, there might also be an effect that the chelator plays in disrupting Lewis acid/base interactions with the heteroatoms of the sorbent. GlycoWorks HILIC SPE is an aminopropyl bonded silica sorbent. The nitrogen atoms of the sorbent might create a site for Lewis acid-base interaction that can only be displaced by the introduction of a strong chelator. No matter the mechanism at play, it has been made apparent by this work that the use of a chelator-based eluent is an effective means to improving the SPE recovery of phosphorylated glycans.

What is claimed is:

1. A method of performing solid phase extraction comprising:

injecting a sample comprising one or more oligonucleotides into a solid phase extraction cartridge comprising a stationary phase, wherein the oligonucleotide is retained by the stationary phase; and washing the solid phase extraction cartridge with a divalent or higher valency carboxylic acid at a concentration of between about 10 mM to about 1 M to elute the one or more oligonucleotides from the solid phase extraction cartridge.

2. A method of performing solid phase extraction comprising:

injecting a sample comprising one or more oligonucleotides into a solid phase extraction cartridge comprising a stationary phase, wherein the one or more oligonucleotides are retained by the stationary phase; and washing the solid phase extraction cartridge with an eluent solution to elute the one or more oligonucleotides from the solid phase extraction cartridge, wherein the eluent solution comprises (i) a salt to adjust ionic strength of the eluent solution and (ii) a divalent or higher valency carboxylic acid at a concentration of between about 10 mM to about 1 M.

3. The method of claim 2, where the salt is selected from the group consisting of ammonium formate, ammonium acetate, sodium formate, sodium acetate, ammonium chloride, sodium chloride, potassium chloride, triethylammonium acetate, and tetramethyl ammonium acetate.

4. The method of claim 2, where the solution is prepared with a co-solvent selected from the group consisting of acetonitrile, methanol, ethanol, propanol, butanol, tetrahydrofuran, an isopropanol.

5. The method of claim 2, wherein the divalent or higher valency carboxylic acid is polycarboxylic acid.

6. The method of claim 2, wherein the concentration is between about 20 mM and about 100 mM.

7. The method of claim 6, wherein the concentration is between about 40 mM and about 60 mM.

* * * * *